United States Patent [19]
Sudrabin

[11] Patent Number: 5,518,922
[45] Date of Patent: May 21, 1996

[54] ACCELERATED COMPOSTING PLATE AND SYSTEM FOR USE

[76] Inventor: David A. Sudrabin, 101 Larchmont Dr., Hendersonville, N.C. 28739

[21] Appl. No.: 419,524

[22] Filed: Apr. 10, 1995

Related U.S. Application Data

[63] Continuation of Ser. No. 118,617, Sep. 10, 1993, abandoned.
[51] Int. Cl.⁶ ..................................................... C05F 17/00
[52] U.S. Cl. ................. 435/290.1; 71/9; 210/151
[58] Field of Search ................... 210/151; 435/290.1; 71/9

[56] References Cited

U.S. PATENT DOCUMENTS 5,053,124  10/1991  Liane ........................ 210/151

*Primary Examiner*—Ferris Lander

[57] ABSTRACT

The process of using a single layer of aeration support blocks to form a composting field having an inclusive air chamber beneath the blocks to maintain the heaps environment for the accelerated composting of vegetation, municipal solid waste, municipal sludge or other compostable material. Further the unique placement, on the individual blocks, of the support footers and the penetrating air nozzles to increase the structural strength of the individual blocks and therefore the entire field. Composting of vegetation, municipal solid waste and municipal sludge is required to reduce the volume of waste deposited into landfills. To provide for a cost efficient method of allowing for the large scale composting operations the following criteria must be met. First the operation must be reusable, through many composting cycles, without requiring replacement of material such as current use piping. Secondly acceleration of the composting process must be provide in the form of uniform control of the environment over the entire base of the composting heap. Thirdly the field and related equipment must be of a design that can be easily maintained and cleaned. This invention satisfies all three of these criteria. Additionally, provision is made to prevent ground water contamination by toxic runoff generated during the composting process.

12 Claims, 4 Drawing Sheets

ACCELERATED COMPOSTING PLATE AND SYSTEM FOR USE

This is a continuation of application Ser. No. 08/118,617, filed Sep. 10, 1993 and now abandoned.

BACKGROUND OF THE INVENTION

1. Field of the Invention

This invention relates to the large scale use of composing fields for the accelerated decomposition of waste material. Composting is a bacterial reaction that breaks down materials to reduce the volume and create a material that is then used for fertilizing soil. Many governments across the country now have mandatory recycling programs in place. These programs require the reduction of the volume of waste placed in landfills. Significant reductions in the volume of waste, that is normally deposited in landfills, is obtainable by composting yard waste and other biodegradable such as municipal solid waste containing paper and other degradable materials. Two major problems facing the managers of composting programs are the physical area required for the composting operations and the time required for the composting process to occur.

2. Brief Description of the Prior Art

In the art we find several attempts to satisfy the requirement of accelerated composting of waste material. The most commonly used method is to use tubes of approximately six inches in diameter with numerous holes throughout their length. These tubes are placed in beds which are usually approximately eight feet wide and fifty to a hundred feet or more long. Yard waste or municipal sludge is then spread over the field to cover and bury the pipe and create a composting pile. Air is injected through the piping to filter up through the composting pile or negative air pressure is applied to the piping to draw air down through the composting pile. Municipal sludge is mixed with a bulking agent such as wood chips. Prior application of a base of wood chips, with a depth of approximately 18 inches and having the purpose of diffusing the air, is required before the introduction of the sludge to the field. Municipal sludge requires approximately 21 days for composting. With yard waste or municipal solid waste requiring between 30 and 120 days depending upon composition of the material and prevailing weather conditions. This method is not as efficient as desired for two primary reasons. For one the air is introduced along the base at the center of the field. As the introduced air has a tendency to filter vertically rather than laterally, the base of the heap along both sides fails to receive adequate treatment. Therefore, the uniformity of the composting of the heap is less than desired. Secondly when the composting material is removed, the pipes are often crushed by the heavy equipment used during the removal. Replacement is then necessary for the next cycle of the field. This requirement significantly increases the operating expense of the composting field.

The most notable Patent is U.S. Pat. No. 5,053,124 issued Oct. 1, 1991 to Schumacher Liane of Germany based on an original filing date of Apr. 8, 1987 in the Federal Republic of Germany. This patent teaches the use of a plurality of opposing sets of four-sided plates that rest one on the other. These plates have perpendicularly intersecting passages between the upper set of plates and the lower set of plates. There is a method to lock the upper plates relative to the lower plates. This patent also teaches the use of seals between the individual plates.

Your applicant is unaware of any use of a single layer of plates to form an array field for the accelerated composting of material.

OBJECTS AND ADVANTAGES OF THE INVENTION

The primary object of the invention is to provide for a complete system for the accelerated composting of biodegradable material in an aeration field upon which the compostable material is placed. Further objects and advantages include;

a) to provide for the use of fiber reinforced cement to form the individual plates of the system.

b) to provide for the individual plates to have sufficient strength to support heavy equipment, such as front end loaders, during the distribution, tending and removal of the compostable material.

c) to provide for a supporting surface, which will receive a plurality of the individual plates, formed of steel reinforced concrete.

d) to provide for the uniform and complete distribution of the individual plates to cover, in a single layer, the entire supporting surface and thus form an array of the plates.

e) to provide the supporting surface with a slight pitch to provide for the adequate drainage of fluids that will gather during the composting process.

f) to provide a liquid impermeable rubber, vinyl or plastic liner to be placed between the supporting surface and the array of plates.

g) to provide a perimeter barrier to encircle the array of plates and to restrict movement of the plates.

h) to provide a perimeter barrier to encircle the array of plates and to ensure containment of any liquids that gather during the composting process.

i) to provide passageways under the array of plates to allow for the introduction of pressurized air under the array of plates.

j) to provide a plurality of air nozzles in each of the individual plates. These air nozzles penetrate from the lower surface to the upper surface of each plate. This provides for the release of the pressurized air, which is between the array of plates and the supporting surface, into the base of the composting heap.

k) to provide for a stronger, more stable and more secure plate by placing a disproportionate number of footers near the edges of the plate compared with the center of the plate.

l) to provide for a stronger and more secure plate by placing a disproportionate number of air nozzles nearer the center of the plate compared with the edges of the plate.

m) to provide for the optional conditioning of the air being introduced between the array of plates and the supporting surface. This conditioning would include controlling the moisture content of the air, the temperature of the air or both.

n) to provide for the pulling of air from the air passages between the array of plates and the supporting surface to allow for the drawing of air through the air nozzles and thus down through the compost heap.

o) to provide for the monitoring of the compost heap for temperature and moisture content.

p) to provide for ease of maintenance using existing equipment, such as a commercial street cleaner or hand held pressure cleaners, by having a relatively smooth upper surface in the array of plates.

q) to provide for ease of placement and removal of the individual plates by limiting their weight to approximately one hundred pounds.

r) to provide for ease of maintenance, after removal of the individual plates, using existing equipment, such as a commercial street cleaner or hand held pressure cleaners, by having the supporting surface relatively smooth.

s) to provide for the optional tapering of the air nozzles to help prevent clogging by the composting material during settling of the heap.

Other objects, advantages and features of the present invention will become apparent to those skilled in the art from the detailed description which follows. It should be understood, however, that the detailed description and specific examples, while indicating preferred embodiment, are given as examples and not limitations. Many changes and modifications to the invention are possible without departing from the spirit of the invention, and all such modifications are included. Thus the scope of the invention should be determined by the appended claims rather than the specific embodiments shown.

REFERENCE NUMERALS IN DRAWINGS

| | |
|---|---|
| 10 Plate | 12 Upper surface |
| 14 Air nozzle | 16 Upper opening |
| 18 Lower opening | 20 Full footer |
| 22 Base | 24 Side |
| 26 Partial footer | 28 Base |
| 30 Support surface | 32 Liquid impermeable membrane |
| 34 Perimeter barrier | 36 Monitor instrument |
| 38 Monitor lead | 40 Ground |
| 42 Receiving surface | 44 Top |
| 46 Compost heap | 48 Perimeter barrier |
| 50 Top | 52 Inner wall |
| 54 Receded wall | 56 Receiving surface |
| 58 Passageway | 60 Air manipulation device |
| 62 Conditioning device | 64 Air connection |
| 66 Support surface | 68 Air nozzle |
| 70 Upper opening | 72 Lower opening |

SUMMARY OF THE INVENTION

This invention relates to a system for the accelerated composting of waste materials such as yard waste, municipal solid waste or municipal sludge. The system is formed around plates that are fabricated in molds using fiber reinforced cement. A plurality of these plates are distributed in a single layer upon a support platform. The support platform is a relatively smooth surface, such as a steel reinforced concrete pad. The individual plates have a geometric shape that allows for the complete covering of the support platform. Additionally the individual plates have a smooth upper surface upon which the compostable material is distributed. The underside of each plate has a plurality of support footers that will rest on the support platform. After distribution of the plates, there exists a continuous air passage, broken only by the support footers, between the series of plates and the support platform. Penetrating each plate, and extending from the upper surface to the lower surface, is a series of air nozzles. These air nozzles allow for the release of pressurized air from the continuous air passage to the surface. Compostable material is distributed upon the upper surface of the field of plates using various equipment such a front end loader. Air is then forced beneath the field of plates where its escapes through the air nozzles and relatively evenly into the base of the heap of compostable material. By monitoring the various conditions within the heap of compostable materials, it is possible to maintain an ideal environment for the composting process. For one, this is accomplished by controlling the moisture content of the heap by controlling the introduction of moisture to the heap. This moisture content would either be within the introduced air or distributed over the upper surface of the compost heap. Secondly, there is control of the air pressure being introduced into the cavity between the plates and the supporting platform. Thirdly it is possible to control the temperature of the air being introduced under the heap.

DESCRIPTION OF THE PREFERRED EMBODIMENT

Figure 1:
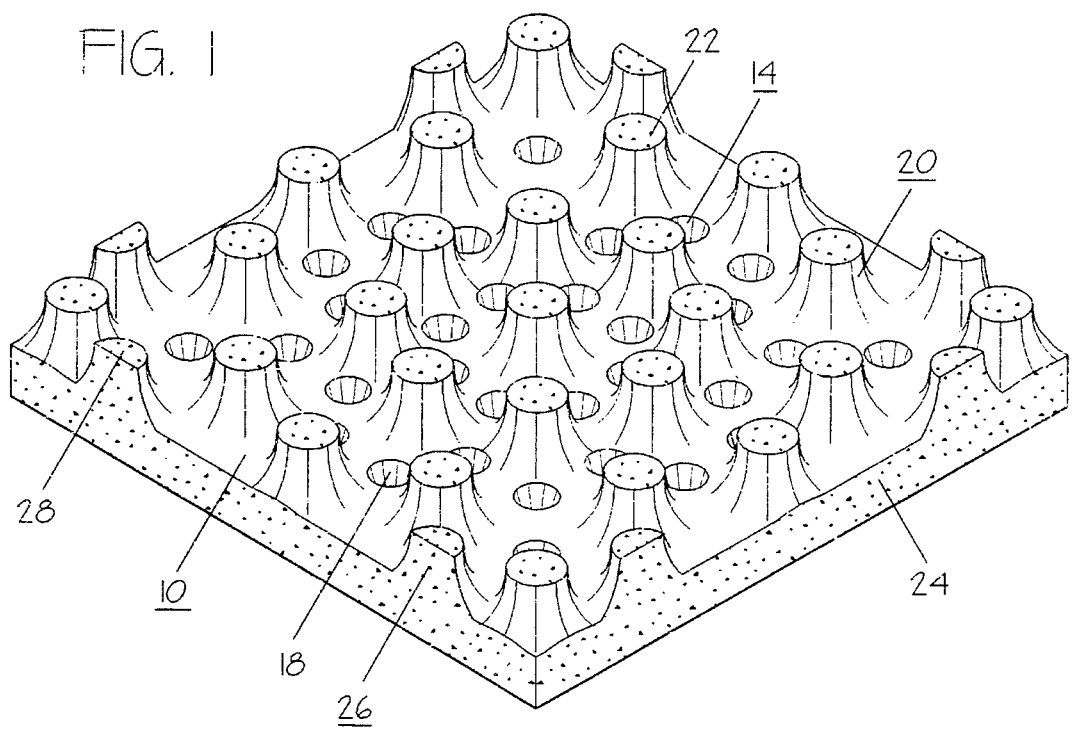
FIG. 1 is a perspective view of the bottom of a composting plate.

Referring now to the drawings where like reference numerals refer to like parts throughout the various views. FIG. 1 is a perspective view of the bottom of a plate 10, having four sides 24 and a plurality of full footers 20 each having a base 22. Additionally having a plurality of partial footers 26 each having a base 28. It being understood that all bases 22 and all bases 28 share the same plane. All footers are shown with shade lines. It will be noted that footers 20 and partial footers 26 are arranged in generally circular patterns extending from the center point of plate 10. It will further be noted that this type of distribution provides greater strength to the plate by eliminating alignment of the thinnest points of the plate. Plate 10 also has a plurality of air nozzles 14 each having a lower opening 18. It being noted that each air nozzle 14 is located between three full footers 20. This positioning of air nozzles 14 provides maximum strength to plate 10. Air nozzles 14 are shown with shade lines illustrating the tapering of the nozzles as they extend to the other side of plate 10. Plate 10 is constructed of fiber reinforced cement in a mold either by pouring and vibration or by spraying. The fibers used can be of a wide variety of materials such as, but not limited to, glass, carbon, steel or polyethylene. While a variety of sizes are possible a standard size of two feet by two feet with a total depth of four inches is preferable. It being understood that the thinnest part of the illustrated plate, excluding the penetrating air nozzles, is two inches thick. The weight of the illustrated plate is approximately one hundred pounds. It is further understood that the individual plates are of one piece.

Figure 2:
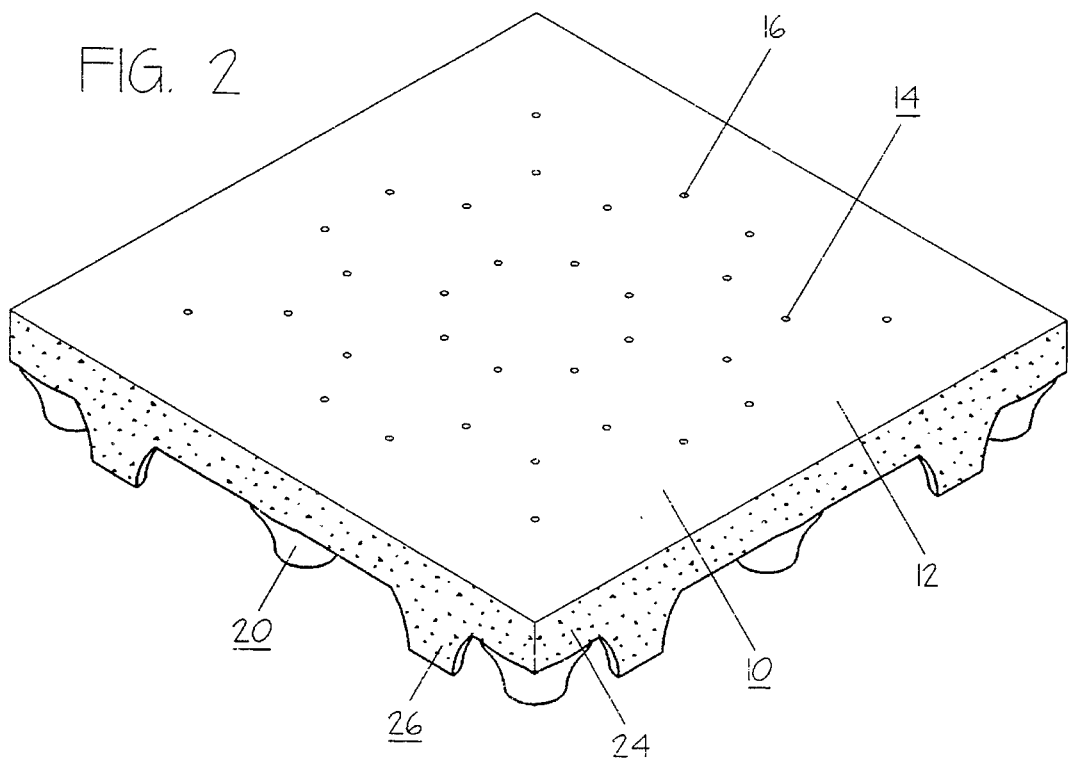
FIG. 2 is a perspective view of the top of a composting plate.

FIG. 2 is an opposing perspective view of plate 10 illustrated in FIG. 1. Plate 10 having upper surface 12 and four sides 24. It being understood that each side 24 will match any other side 24 on a corresponding plate. Upper surface 12 is penetrated by a plurality of air nozzles 14 each having an upper opening 16. It being understood that while air nozzle 14 could be of a uniform diameter as it penetrates plate 10, that it is preferable to have a tapered design. Shown are partial footers 26 and full footers 20 which extend from plate 10.

It being understood that the plane formed by all bases 22 and all bases 28, shown in FIG. 1, are parallel to the plane formed by upper surface 12, shown in FIG. 2.

In use, a plurality of plates 10 would be distributed to form a composting field of up to twenty feet or more wide and up to one hundred feet or more long.

It is understood that the plate illustrated, while indicating preferred embodiment, is given as an illustration, and not a limitation. While the thickness of the illustrated plate is four inches from the plane formed by the base to the upper surface, wide variation is possible depending upon the various fibers used for reinforcement. While glass reinforced cement may require two inches of thickness between the upper surface and the upper most part of the void formed by the protruding extensions, stronger, and substantially more expensive, carbon fibers may only require one inch of thickness. The use of different fibers, with substantially different strength factors, and therefore varying thicknesses of the individual plates, is envisioned and disclosed.

Figure 3:
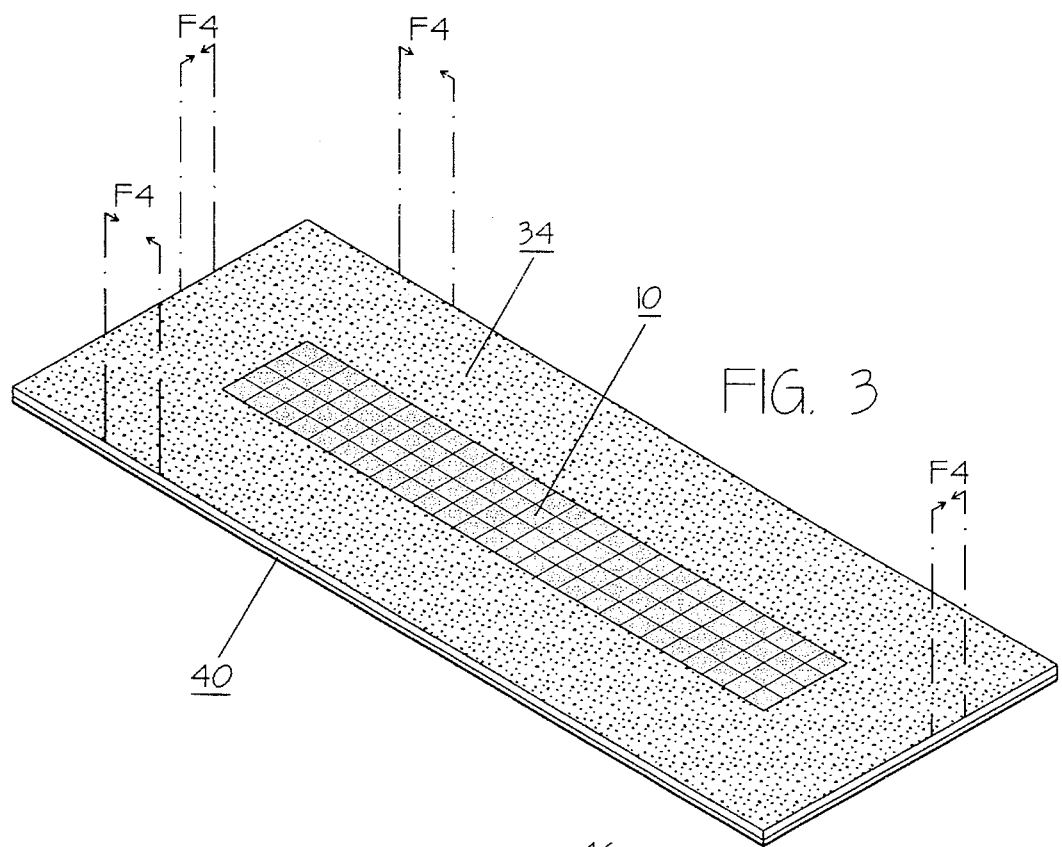
FIG. 3 is a perspective view of a small composting field showing a plurality of plates with the surrounding perimeter barrier. Also shown are section lines referenced 'F4' as used for FIG. 4.

FIG. 3 is a perspective view of a small composting field formed by a plurality of plates 10 and a perimeter barrier 34. Shown are one hundred and four plates 10 arranged in an array four plates wide and twenty-six plates long. It being noted that the preferred size of the individual plate 10 is two feet by two feet by four inches thick from upper surface to base of footers. Therefore the area covered by plates 10, in FIG. 3, is eight feet by fifty-two feet. Perimeter barrier 34, constructed of a suitable material such as steel reinforced concrete, extends beyond the array of places 10 on all four sides a suitable distance, such as ten feet. Perimeter barrier 34 rests on ground 40 being a prepared surface such as with any conventional construction. As explained for FIG. 4 plates 10 are restricted in their lateral movement by perimeter barrier 34. Shown are section lines referenced 'F4' as used for FIG. 4.

Figure 4:
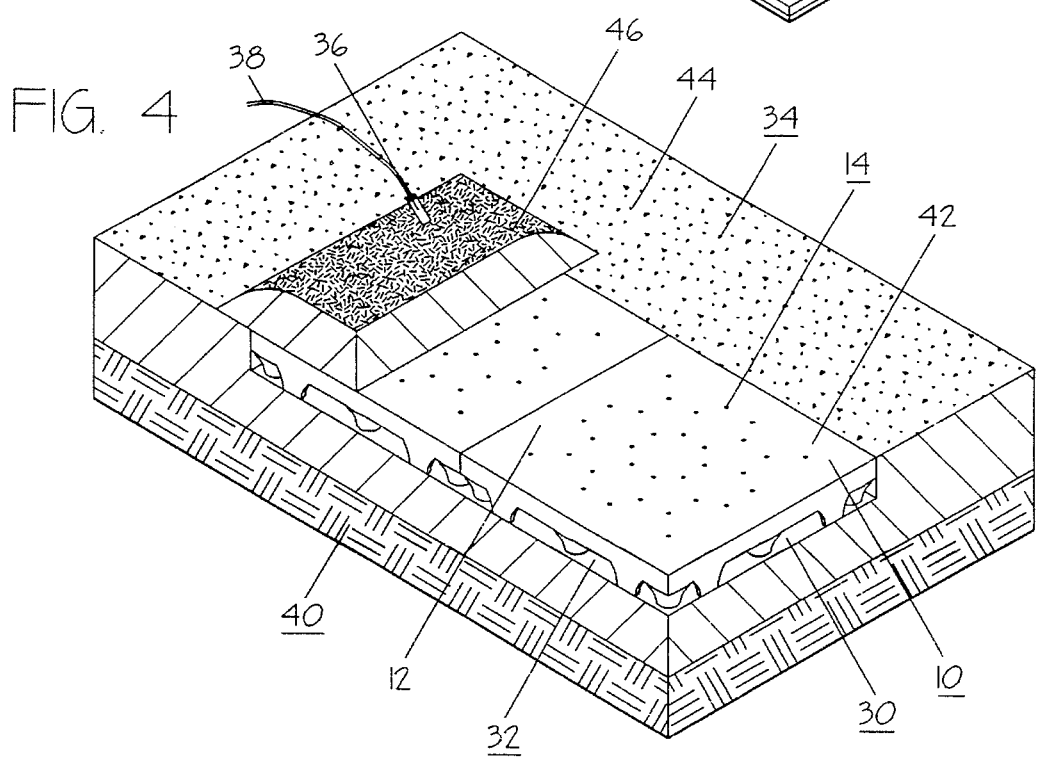
FIG. 4 is a perspective view of a cutaway corner of the composting field illustrated in FIG. 3 showing a cutaway of an extremely small compost heap.

FIG. 4 is a perspective view of a cutaway section of the composting field illustrated in FIG. 3 by section lines with references 'F4'. Shown is perimeter barrier 34 having a top 44 and a support surface 30. It being noted that support surface 30 is recessed from top 44 by a measurement equal to the thickness of plate 10. Perimeter barrier 34 is constructed of a suitable material, such as steel reinforced concrete, on ground 40 with a slight pitch to facilitate collection of accumulated liquids. Liquid impermeable membrane 32, being a suitable material such as vinyl, plastic or rubber, is placed on support surface 30 so as to complete cover it. Membrane 32 has the purpose of containing liquids and preventing them from seeping into ground 40 and contaminating the ground water. A plurality of plates 10 rest upon membrane 32 and fit snugly with the recessed area of perimeter barrier 34 which prevents movement of plates 10 during the various operations in the compost cycle. Plate 10 each have a plurality of air nozzles 14 which penetrate each plate. The plurality of upper surfaces 12 of plates 10 combine with top 44 of perimeter barrier 34 to form a receiving surface 42 which forms a relatively smooth surface for the depositing of compostable material represented by compost heap 46. In practice, compost heap 46 would be up to ten feet or more high and cover all plates 10 within the compost array. Further it would extend over a substantial area of the remainder of perimeter barrier 34. During the tending process of the composting cycle monitoring of compost heap 46 would take place using a plurality of monitor instruments 36 connected by monitor leads 38. It being understood that the use of hand held instruments is envisioned, and disclosed. This monitoring would be to determine the temperature and moisture content within the heap. This would permit the adjustment and maintenance of ideal conditions for the accelerated composting process.

Figure 5:
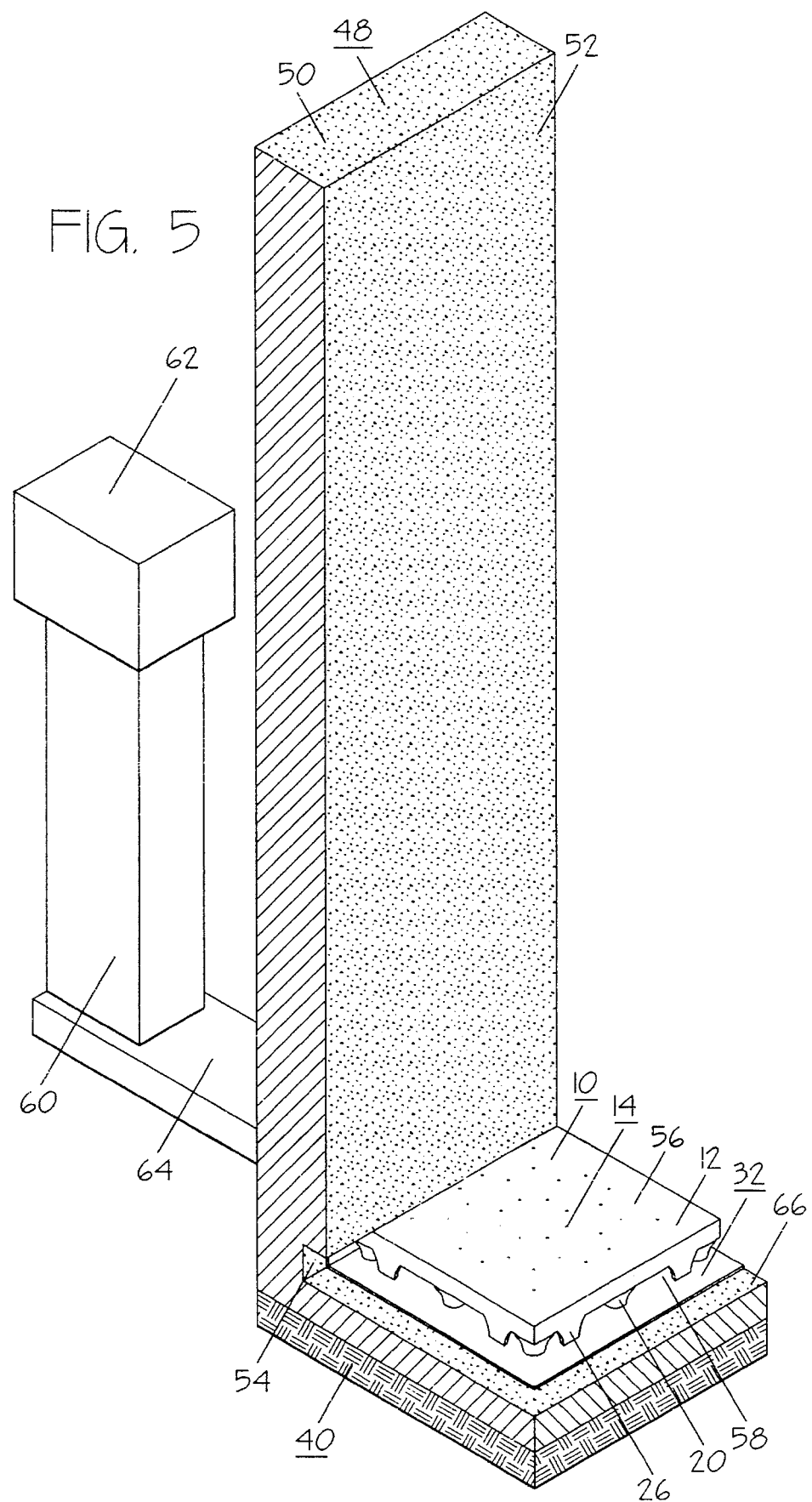
FIG. 5 is a perspective view showing a cutaway section of a second embodiment of a composting field with one plate and various air control equipment.

FIG. 5 is a perspective view of a cutaway section of a second embodiment of a perimeter barrier 48 which rests on ground 40. This embodiment contains at least one inner wall 52 which raises from support surface 66 by approximately twelve feet and ends with top 50. Inner wall 52 then can act to contain compostable material during the composting process and during the removal process utilizing front end loaders. Shown is one plate 10 having an upper surface 12, which forms receiving surface 56, and a plurality of air nozzles 14 which penetrate to passageway 58. Passageway 58 is a continuous void formed between liquid impermeable membrane 32 and plate 10 by the cavities formed between all full footers 20 and all partial footers 26. Perimeter barrier 48 is penetrated by air connector 64 which is connected to air manipulation device 60. Conditioning device 62 controls the temperature and moisture content of the air which is introduced by air manipulation device 60 into passageway 58 between plates 10 and support surface 66. Once within passageway 58, and under pressure, conditioned air escapes through air nozzles 14 into the base of the compost heap. There it filters through the heap to maintain ideal conditions for the accelerated composting process. Optionally receded wall 54 would be placed at the base of inner wall 52 to allow a more secure locking of plates 10. Air can be introduced into passageway 58 with positive pressure using air manipulation device 60 which results in passage through air nozzles 14 into the base of the compost heap. Air manipulation device 60 can also apply negative pressure by drawing air from passageway 58. This would result in air being drawn down through the compost heap and down through air nozzles 14 from the outside air.

Figure 6:
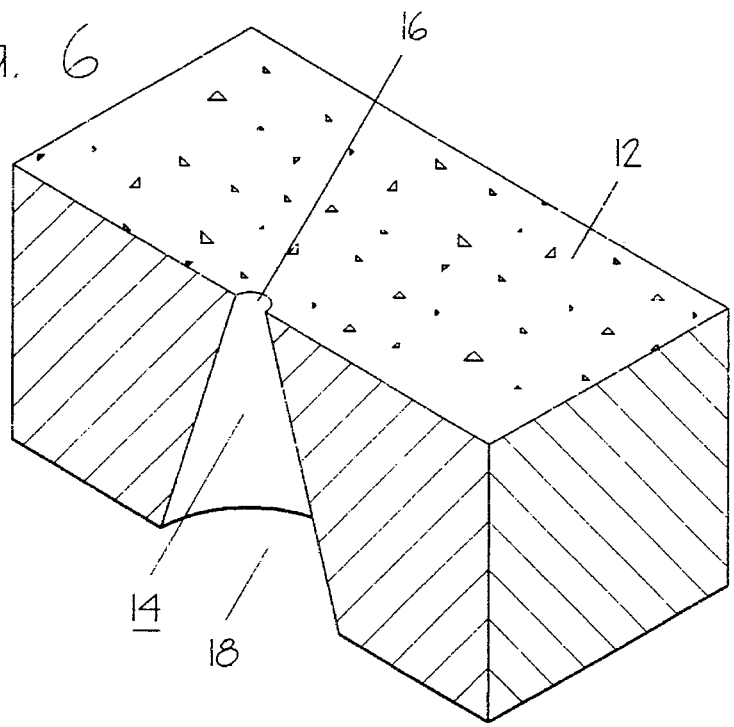
FIG. 6 is a perspective view showing a cutaway section of a plate centered on an air nozzle.

FIG. 6 is a perspective view of a cutaway section of a plate centered on an air nozzle 14. Shown is upper surface 12, upper opening 16 and lower opening 18. It being understood that lower opening 18 is of a significantly greater diameter than upper opening 16 and that air nozzle 14 therefore has a tapered shape to it. Air passes through air nozzle 14 into the compost heap while debris which fits into upper opening 16 falls through without concern for clogging air nozzle 14.

Figure 7:
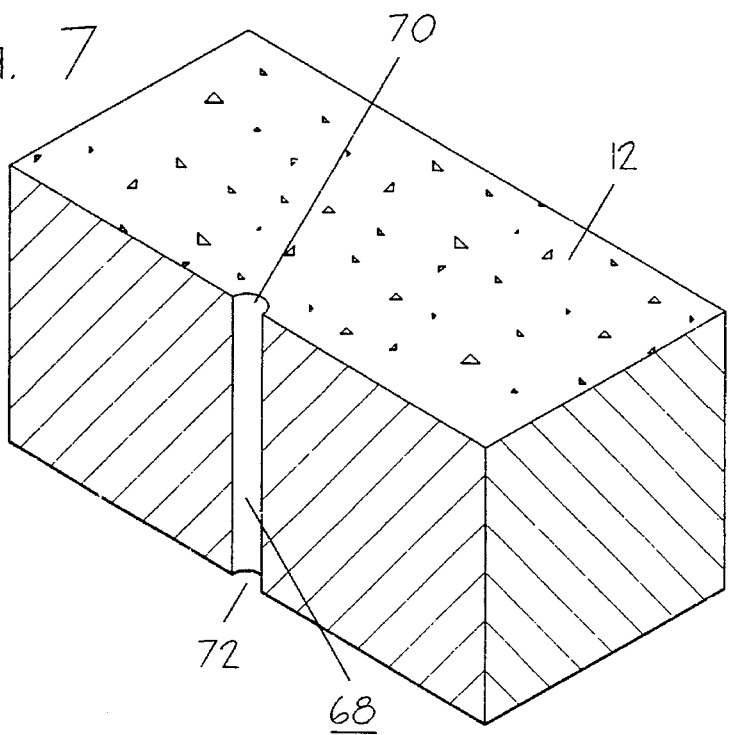
FIG. 7 is a perspective view showing a cutaway section of a plate centered on a second embodiment of an air nozzle.

FIG. 7 is a perspective view of a cutaway section of a plate centered on a second embodiment of an air nozzle 68. Shown is upper surface 12, upper opening 70 and lower opening 72.

CONCLUSIONS AND RAMIFICATION OF THE INVENTION

The composting field comprising the individual plates has many distinct and innovative features. The financial expense of maintaining and operating this system is a primary advantages over current accelerated composting systems. The plurality of plates, distributed in a single layer on a relatively smooth and level surface, provides ease of cleaning to the entire system. On a regularly occurring interval of time all of the systems in current use must be cleaned. With the designs known in the art, this is a complicated and expensive process.

Slight shifting of the individual plates is anticipated resulting in slight gaps between the individual plates. Therefore, a relatively small loss of air from the cavity between the plates and the supporting surface could take place at the edges between the plates. Similarly some debris from the composting material could enter the cavity between the plates and the supporting surface. Some debris will enter the cavity by penetrating the air nozzles. The air nozzles have a tapered design to prevent clogging. Because the exposed surfaces of the plates and the supporting surface are both relatively smooth, there are few opportunities available for clogging of the air passages between the plates and the supporting surface. Therefore our system will require less frequent cleaning, and therefore allow more cycles of use, than most systems know in the art.

The maintenance of our system would be such that after the composting cycle was complete the composted material would be removed as normal. Then currently available equipment, such as a commercial street cleaner or hand held pressure cleaners, would be used to clean the entire exposed surface of the field. This would remove all exposed material and would flush the air nozzles with water and force any trapped debris below the plates to the supporting surface. Then the plates would be removed, using individuals who would load them by hand on the vehicles, or utilizing equipment such as a fork lift. Then the same equipment that was used to clean the plate's upper surface would be used to clean the smooth supporting surface. At which time the plates would be redistributed over the composting field, using the same method used to remove them.

The disclosed size and thickness of the individual plates are given as examples and not limitations. Depending upon the composition of the fibers used to reinforce the cement that is used to construct the plates, widely varying thicknesses of the individual plates are possible, envisioned and disclosed. It is important to maintain a certain weight to each individual plate, that weight being a sufficient weight that will provide stability and restrict movement of the individual plates while being light enough to permit lifting by no more than two adult men. To maintain this ideal weight it is envisioned that the size of the individual plates will be adjusted depending upon the fibers used in there construction. Stronger fibers will permit thinner plates to be manufactured with a possible increase in the length and width of the plate.

I claim:

1. A composting system comprising:
   a) a plate lacking fracture planes, the plate formed of fiber reinforced concrete in a single piece, the plate comprising:
      1) an upper side to provide for support of biodegradable material;
      2) a lower side;
      3) a plurality of perimeter sides;
      4) numerous support footers extending from the lower side of the plate and each having a base, each base having a planar surface, all of the planar surfaces of the bases having a common plane, the support footers positioned in concentric circles extending outward from a central point on the lower side;
      5) a conduit-like area to provide for movement of air between the lower side of the plate and the common plane formed by the bases of the support footers;
      6) a plurality of air nozzles, each air nozzle penetrating the plate from the upper side to a position on the lower side between at least three of the support footers, the air nozzles to provide for passage of air through the plate between the upper side and the conduit-like area;
   b) a support surface to provide for support of a single layer of a plurality of the plates;
   c) a perimeter barrier to provide for closure of exposed perimeter sides of the single layer of the plates;
   d) a membrane to provide for containment of liquids to prevent seepage below the support surface, the membrane being liquid impenetrable and placed so as to completely cover the support surface;
   e) a manifold void formed of the conduit-like area of the plurality of plates, the manifold void to provide for air pressure to be controlled between the single layer of plates and the support surface for transfer through the air nozzles, the manifold void existing between the membrane covering the support surface and the lower side of the plates;
   f) an air connection to provide for air pressure to be applied to the manifold void;
   whereby a single layer of plates would be deployed so as to allow the depositing of compostable material where air would be transferred through the plates between the manifold void and the base of the compostable material to accelerate and promote the bacterial process of composting.

2. The composting system defined in claim 1 wherein a plurality of the support footers of the plate are each bisected by one of the perimeter sides of the support plate; whereby extra support is provided to the edges of the individual plate from the weight of equipment which transverse the upper surface during distribution, tending and removal of the compostable material.

3. The composting system defined in claim 1 wherein the plurality of air nozzles of the plate are placed in a plurality of concentric circular patterns extending from a center of the plate; whereby elimination of aligned rows and columns of the air nozzles is achieved to strengthen the individual plates.

4. The composting system defined in claim 1 wherein each of the air nozzles of the plate is situated central between three of the support footers; whereby the plate is strengthened by elimination of aligned thinner weak points within the plate.

5. The composting system defined in claim 1 wherein the lower openings of the air nozzles of the plate have a greater diameter than the diameter of the upper opening of the air nozzle of the plate; whereby a tapering design to the air nozzle aids in preventing clogging of the air nozzles during the composting process.

6. The composting system defined in claim 1 wherein the dimensions of the plate are a width of approximately two feet, a length of approximately two feet and a thickness of approximately four inches, the thickness measured from the upper side of the plate to the base of the support footers of the plate.

7. The composting system defined in claim 1 wherein the vertical surfaces of the perimeter barrier have a vertical height equal to a thickness of the plate, the thickness of the plate measured from the upper side of the plate to the base of the support footers of the plate; whereby the upper side of the plurality of plates form a receiving surface which forms a continuous surface with the surrounding perimeter barriers upper surface.

8. A compost aeration block lacking fracture planes, the compost aeration block constructed of fiber reinforced cement and being of one piece, the compost aeration block comprising:

a) an upper side;

b) a lower side;

c) a plurality of side edges vertically oriented;

d) numerous support footers extending from the lower side and each having a support base, the support footers situated in concentric circles radiating from a center of the lower side;

e) a common base plane formed by the support bases of the support footers;

f) a manifold channel formed between the support footer of the compost aeration block and the common base plane of the support bases, the manifold channel to provide for air flow below the compost aeration block and above the support bases of the support footers;

g) a plurality of penetrating air nozzles to provide for passage of air from the manifold channel through the compost aeration block, each air nozzle penetrating the compost aeration block from the upper side to a position between at least three of the support footers on the lower side.

9. The compost aeration block defined in claim 8 wherein a plurality of the support footers of the compost aeration block are each bisected by one of the side edges of the compost aeration block; whereby extra support is provided to the edges of the compost aeration block from the weight of equipment which transverse the upper side during distribution, tending and removal of the compostable material.

10. The compost aeration block defined in claim 8 wherein the plurality of air nozzles of the compost aeration block are situated in concentric circles radiating from a center of the lower side; whereby elimination of aligned rows and aligned columns of the air nozzles is achieved to strengthen the compost aeration block.

11. The compost aeration block defined in claim 8 wherein the lower opening of the air nozzles of the compost aeration block have a greater diameter than the diameter of the upper opening of the air nozzle of the compost aeration block; whereby a tapering design of the air nozzle aids in preventing clogging of the air nozzles during the composting process.

12. The compost aeration block defined in claim 8 wherein the compost aeration block have dimensions of a width of approximately two feet by a length of approximately two feet and a thickness of approximately four inches, the thickness measured from the upper side of the compost aeration block to the support base of the support footers of the compost aeration block.

* * * * *